(12) United States Patent
Steenkamp

(10) Patent No.: US 6,251,453 B1
(45) Date of Patent: Jun. 26, 2001

(54) PROCESS FOR PREPARING FRUIT OF THE PLANT OF SOLANACEAE CAPSICUM

(75) Inventor: Johannes Martinus Steenkamp, Tzaneen (ZA)

(73) Assignees: David D. F. Gilmour, Birkenhead Merseyside; Piquante International Limited, Virgin Islands, both of (GB)

( * ) Notice: Subject to any disclaimer, the term of this patent is extended or adjusted under 35 U.S.C. 154(b) by 0 days.

(21) Appl. No.: 09/328,297

(22) Filed: Jun. 8, 1999

Related U.S. Application Data

(63) Continuation of application No. PCT/GB96/03042, filed on Dec. 9, 1996.
(51) Int. Cl.⁷ .............................. A23B 7/10; A23B 7/153; A23L 3/3454
(52) U.S. Cl. ...................... 426/262; 426/268; 426/270; 426/321; 426/615; 426/478; 426/479; 426/481; 426/484; 426/506; 426/509
(58) Field of Search .................................. 426/262, 268, 426/270, 321, 324, 615, 442, 478, 479, 481, 484, 506, 509, 520, 521

(56) References Cited

U.S. PATENT DOCUMENTS 4,614,655 * 9/1986 Hashino et al. ................. 426/615 X
4,828,848 * 5/1989 Owades ............................ 426/615 X

FOREIGN PATENT DOCUMENTS

92/03934 * 3/1992 (WO).

\* cited by examiner

*Primary Examiner*—Milton Cano
(74) *Attorney, Agent, or Firm*—Pennie & Edmonds LLP

(57) ABSTRACT

A process for preparing fruits of plants in the family Solanaceae, genus capsicum is provided. The process includes the step of boiling the fruits for a period of less than 300 seconds in a solution of a sweetener such as sugar in an acideous liquid such as vinegar.

7 Claims, No Drawings

PROCESS FOR PREPARING FRUIT OF THE PLANT OF SOLANACEAE CAPSICUM

This is a continuation of the U.S. phase of PCT application no. PCT/GB96/03042 filed Dec. 9, 1996 published as WO 98/25482.

BACKGROUND

This invention relates to a process for preparing a foodstuff from fruits of plants of the family Solanaceae, genus capsicum and to the products of such process.

Various processes for preparing sauces, relished and chutney using fruits of plants in the family Solanaceae, genus capsicum are known. For example, FR-A-2,674,103 discloses a process for the preparation of a foodstuff from red peppers, in which the piths of the fruits are removed, the peppers are boiled in a solution comprising sugar and vinegar and subsequently sterilized. A disadvantage of this process is that the peppers are prone to discoloration after a period of time.

Further, for example, Farrell, K T, Spices, Condiments and Seasoning, AVI Book, New York, (1990), pp. 157–161 discloses that anti-oxidants are commonly used to prevent discoloration of oleoresin of paprika by subsequent heat treatment. The following documents namely Lord, i.e., Everybody's cook book. Henry Holt and Company, New York, (1924), pp. 460, 462 and U.S. Pat. No. 4,828,848 disclose processes for producing a food stuff from peppers, the method including the steps of removing piths and boiling the peppers in a solution of sugar and vinegar.

A disadvantage of the above processes is that they are usually not suitable for preparing foodstuffs from tender fruits such as those from plants of the family Solanaceae, genus capsicum, species annuum, because these known processes usually cause the fruits to lose their consistency due to the tenderness of these types of fruits.

OBJECT OF THE INVENTION

It is accordingly an object of the present invention to provide a process for preparing a foodstuff from fruits of plants of the family of Solanaceae, genus capsicum and a product of such process which are useful alternatives to the known processes and products. It is further an object of the invention to provide a process suitable for preparing a foodstuff from fruits of plants of the family Solanaceae, genus capsicum, species annuum.

SUMMARY OF THE INVENTION

According to the present invention there is provided a process for preparing a foodstuff from fruits of plants of the family Solanaceae, genus capsicum, the process including the step of boiling the fruits for a period of less than 300 seconds in a solution of a sweetener in an acideous liquid.

The acideous liquid may be vinegar.

The sweetener may be sugar.

Preferably the solution is prepared by diluting vinegar with water to obtain a dilution comprising 60% water and 40% vinegar on a mass per volume basis and dissolving sugar in the dilution.

The fruits may be the fruits of plants of the family Solanaceae, genus capsicum, species annuum.

The process may further include the step of adding at least one flavoring material of sodium chloride, chili or the like to the solution.

The fruits may be picked from the plants approximately two days after the fruits show signs of ripening by changing color.

The fruits are preferably processed within 24 hours from picking.

The fruits are preferably boiled in the solution for a maximum of 180 seconds during the process.

The pith of each fruit may be removed prior to boiling the fruits.

In one embodiment of the invention the fruits are picked after a period of longer that two days after the fruits show signs of ripening by changing color. In this embodiment, the fruits are boiled in the solution, removed from the solution and pulped. Starch is preferably added to the pulped fruits.

The process may further include the step of adding ascorbic acid to the foodstuff.

The process further include the steps of bottling the foodstuff and passing the foodstuff through a steam tunnel. Preferably the foodstuff is bottled at a temperature of 80° C. and passed through the stem tunnel at a temperature of 90° C.

According to another aspect of the invention there is provided a foodstuff comprising fruits of plants of the family Solanaceae, genus capsicum, processed by the above described process.

DESCRIPTION OF PREFERRED EMBODIMENTS

Processes for preparing foodstuffs according to preferred embodiments of the invention, will now be described by way of example only.

According to a first preferred embodiment of the invention, a process for preparing a foodstuff from fruits of plants in the family Solanaceae, genus capsicum, species annuum includes the step of picking the fruits by hand approximately two days after the fruits show signs of ripening by changing color from green to red.

The process further includes the steps of:

providing 150 liters of a dilution of vinegar with water comprising 60% water and 40% vinegar on a mass per volume basis;

dissolving 75 kilograms sugar in the dilution to obtain a solution;

dissolving 2 kilograms sodium chloride in the solution;

boiling 115 kilograms of the fruits within 24 hours from picking, in the solution for 180 seconds;

adding 0.2 kilogram ascorbic acid;

bottling the boiled fruits and filling the bottles with the solution at a temperature of 80° C.;

adding flavoring such as chili extract;

passing the bottles containing the fruits and solution through a steam tunnel at 90° C. with the bottles being uncapped; and capping the bottles.

A foodstuff is obtained by the process which is not only appealing to the eye but also suitable for use to compliment a variety of other foodstuffs.

The applicant has found that boiling the fruits longer than 300 seconds is undesirable because the fruits lose their flavor and consistency. Ideally the fruits are not boiled for more than 180 seconds.

According to a second embodiment of the invention, the fruits are picked after a period longer than two days after showing signs of ripening by changing color. The fruits are then boiled in the above-mentioned solution and then liquidized to form a pulp. Flavoring, such as crushed sun-dried peppers, are thereafter added. For each 55 liters of pulp, 2 kilograms of starch and 45 liters of water are added to obtain a sauce, The sauce is heated to 90° C.; bottled; passed through a steam tunnel at 90° C.; and used as a food stuff such as relish or chutney.

The applicant has found that the foodstuffs manufactured according to the processes set out above possess a unique and pleasant flavor that usually enhances the palatability of a large number of other foodstuffs.

What is claimed is:

1. A process for preparing a foodstuff from fruits of plants of the family Solanaceae, genus capsicum, species annuum, the process including the steps of:

picking the fruits approximately two days after the fruits show signs of ripening by changing color;

removing pith from the fruit and then boiling the fruit for a period of time of less than 300 seconds in a solution of sugar and vinegar to form a foodstuff;

adding an agent for restricting discoloration of the boiled fruits to the foodstuff; and passing the foodstuff through a steam tunnel.

2. A process according to claim 1 wherein the agent for restricting discoloration is ascorbic acid.

3. A process according to claim 1 wherein the fruits are processed within 24 hours from picking.

4. A process according to claim 1 which includes the further steps of bottling the foodstuff at a temperature of at least 80° C. and passing the bottled foodstuff through the steam tunnel at a temperature of at least 90° C.

5. A process according to claim 1 which includes the further step of adding flavoring to the foodstuff, the flavoring including sodium chloride or chili.

6. The process of claim 1, wherein the solution comprises sugar dissolved in a mixture of about 60% water and about 40% vinegar on a mass per volume basis.

7. The process of claim 1, wherein the fruit is boiled for a period of time of not more than 180 seconds.

* * * * *